(12) United States Patent
Sottiaux et al.

(10) Patent No.: US 9,156,237 B2
(45) Date of Patent: Oct. 13, 2015

(54) ATTACHABLE ELASTOMERIC PAD

(75) Inventors: Daniel P. Sottiaux, Flower Mound, TX (US); Frank B. Stamps, Colleyville, TX (US); Patrick R. Tisdale, Keller, TX (US); Terry K. Thompson, Bedford, TX (US); Loan Thanh Vo, Hurst, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 945 days.

(21) Appl. No.: 13/350,325

(22) Filed: Jan. 13, 2012

(65) Prior Publication Data

US 2013/0183508 A1  Jul. 18, 2013

(51) Int. Cl.
*B32B 25/10* (2006.01)
*B32B 37/02* (2006.01)
*B29C 65/50* (2006.01)
*B29C 65/00* (2006.01)
(Continued)

(52) U.S. Cl.
CPC ............... *B32B 37/02* (2013.01); *B29C 65/02* (2013.01); *B29C 65/48* (2013.01); *B29C 65/5014* (2013.01); *B29C 65/5021* (2013.01); *B29C 65/5028* (2013.01); *B29C 65/5057* (2013.01); *B29C 66/0222* (2013.01); *B29C 66/45* (2013.01); *B29C 66/4722* (2013.01); *B29C 66/7212* (2013.01); *B29C 66/72141* (2013.01); *B29C 66/73751* (2013.01); *B29C 66/73755* (2013.01); *B29C 66/8322* (2013.01); *B29C 66/919* (2013.01); *B29C 66/91411* (2013.01); *B32B 7/12* (2013.01); *B32B 25/10* (2013.01); *B32B 37/18* (2013.01); *C08J 5/121* (2013.01); *C09J 5/06* (2013.01); *B29C 35/02* (2013.01); *B29C 65/4835* (2013.01); *B29C 66/71* (2013.01); *B29C 66/7392* (2013.01); *B29C 66/7394* (2013.01); *B29C 66/81455* (2013.01); *B29C 66/83221* (2013.01); *B32B 37/12* (2013.01); *B32B 2262/101* (2013.01); *B32B 2305/076* (2013.01); *B32B 2307/54* (2013.01); *B32B 2317/22* (2013.01); *B32B 2319/00* (2013.01); *B64C 27/33* (2013.01); *C08J 2321/00* (2013.01); *C09J 2400/143* (2013.01); *C09J 2421/006* (2013.01); *Y10T 428/24975* (2015.01); *Y10T 428/264* (2013.01); *Y10T 442/3528* (2015.04)

(58) Field of Classification Search
None
See application file for complete search history.

(56) References Cited

U.S. PATENT DOCUMENTS 3,542,080 A   11/1970   Tomb
3,802,285 A   4/1974    Williams
(Continued)

FOREIGN PATENT DOCUMENTS

| CN | 1572482 | 2/2005 | |
|---|---|---|---|
| CN | 2868670 | 2/2007 | |
| JP | 4005041 | 1/1992 | ............. B09C 35/02 |

OTHER PUBLICATIONS

Canadian Intellectual Property Office, Office Action dated Jul. 30, 2013 re Patent Application No. 2,801,296.
(Continued)

*Primary Examiner* — Barbara J Musser
(74) *Attorney, Agent, or Firm* — Baker Botts L.L.P.

(57) ABSTRACT

According to one embodiment, a method comprises calendering an elastomeric material into an elastomeric layer having a thickness that is more uniform than the elastomeric material prior to the calendaring. After calendaring, the elastomeric layer is vulcanized to a composite shim comprising at least one reinforcement layer and at least one layer of adhesive.

11 Claims, 3 Drawing Sheets

(51) Int. Cl.
  *B32B 37/18* (2006.01)
  *C08J 5/12* (2006.01)
  *C09J 5/06* (2006.01)
  *B32B 7/12* (2006.01)
  *B29C 65/02* (2006.01)
  *B29C 65/48* (2006.01)
  *B29C 35/02* (2006.01)
  *B32B 37/12* (2006.01)
  *B64C 27/33* (2006.01)

(56) References Cited

U.S. PATENT DOCUMENTS

| | | | |
|---|---|---|---|
| 4,306,836 A | 12/1981 | Mayerjak | |
| 4,466,848 A * | 8/1984 | Ogawa | 156/242 |
| 4,886,419 A | 12/1989 | McCafferty | |
| 5,904,010 A | 5/1999 | Javid et al. | |
| 6,368,989 B1 * | 4/2002 | Pascual et al. | 442/254 |
| 7,171,697 B2 * | 2/2007 | Vito et al. | 2/161.1 |
| 7,217,452 B2 | 5/2007 | Rustemeyer et al. | |
| 2004/0086735 A1 | 5/2004 | Monsheimer et al. | 428/493 |
| 2004/0234744 A1 | 11/2004 | Byma et al. | |
| 2011/0056779 A1 | 3/2011 | McGee et al. | |

OTHER PUBLICATIONS

Extended European Search Report; Application No. 12155988.4 - 2307; pp. 9, May 24, 2012.

Database WPI; "XP-002675707"; Thompson Scientific, London, GB; pp. 2, 1992.

The First Office Action, State Intellectual Property Office of People's Republic of China, Application No. 201310011284.X, Dated Sep. 28, 2014, 20 pages.

Second Office Action, State Intellectual Property Office of People's Republic of China, Application No. 201310011284.X, Dated May 18, 2015, 8 pages.

* cited by examiner

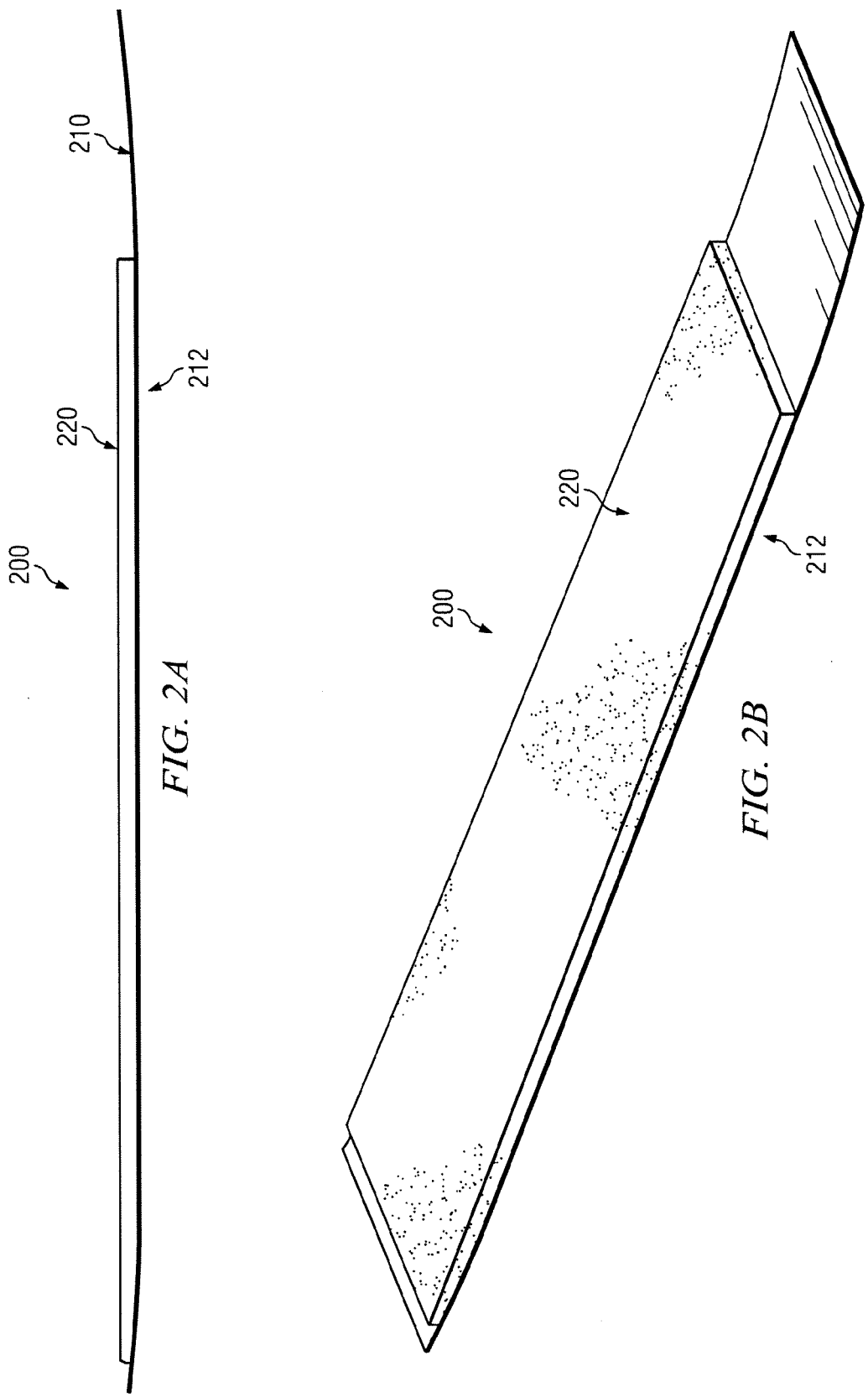

US 9,156,237 B2

ATTACHABLE ELASTOMERIC PAD

TECHNICAL FIELD

This invention relates generally to elastomeric materials, and more particularly, to an adjustable elastomeric pad.

BACKGROUND

An elastomeric material is a material, such as a polymer, having the property of viscoelasticity (colloquially, "elasticity"). An example of an elastomeric material may include rubber. Elastomeric materials generally have a low Young's modulus and a high yield strain when compared to other materials. Elastomeric materials are typically thermosets having long polymer chains that cross-link during curing (i.e., vulcanizing).

SUMMARY

According to one embodiment, a method comprises calendering an elastomeric material into an elastomeric layer having a thickness that is more uniform than the elastomeric material prior to the calendaring. After calendaring, the elastomeric layer is vulcanized to a composite shim comprising at least one reinforcement layer and at least one layer of adhesive.

Particular embodiments of the present disclosure may provide one or more technical advantages. A technical advantage of one embodiment may include the capability to attach elastomeric material to a part without directly vulcanizing the elastomeric material to the part. A technical advantage of one embodiment may also include the capability to reduce the required heat and pressure for attaching elastomeric material to a part. A technical advantage of one embodiment may also include the capability to ensure a strong bond between elastomeric material and a part while limiting the part's exposure to the elastomeric molding process. A technical advantage of one embodiment may also include the capability to manufacture an elastomeric pad for later attachment to a part.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2A shows a side view of an elastomeric pad having elastomeric material that may be attached to the composite part of FIG. 1 without direct vulcanization according to one embodiment;

FIG. 2B shows a perspective view of the elastomeric pad of FIG. 2A;

DETAILED DESCRIPTION OF THE DRAWINGS

Figure 1:
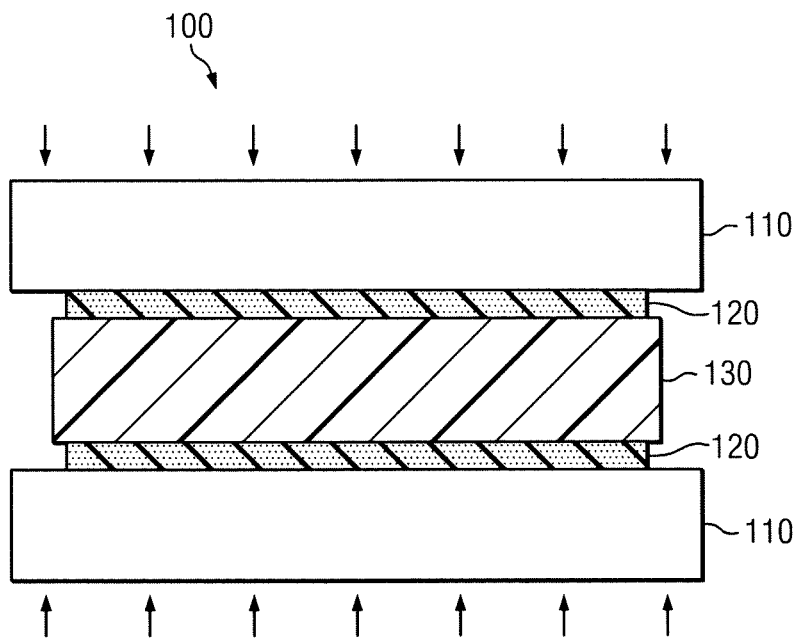
FIG. 1 shows a vulcanization system for vulcanizing two layers of elastomeric material directly to a composite part.

FIG. 1 shows a vulcanization system 100. Vulcanization system 100 includes a tool 110 for vulcanizing (e.g., curing) elastomeric layers 120 to two sides of composite part 130.

Elastomeric layers 120 may be provided on composite part 130 for a variety of reasons. For example, composite part 130 may be subject to impact forces, and elastomeric layers 120 may strain on composite part 130. Elastomeric layers 120 may also reduce impact and friction forces on composite part 130. Reducing forces on composite part 130 may be particularly important depending on the replacement cost of composite part 130.

Elastomeric layers 130 and composite part 130 may exhibit unique physical and chemical characteristics. Elastomeric layers 120 are layers of elastomeric material, such as rubber, that have the property of elasticity. The elastomeric material may have long polymer chains that cross-link during curing, i.e., vulcanizing. The elasticity may be derived from the ability of the long chains to reconfigure and distribute an applied stress.

Composite part 130 is a part constructed from two or more constituent materials with different physical or chemical properties. The different constituent materials may remain separate and distinct at the macroscopic or microscopic scale within composite part 130 after construction. There are two general categories of constituent materials: matrix and reinforcement. Examples of matrix material may include polymer matrix material, also known as resin solution. Examples of reinforcement materials may include fibers and ground minerals.

Composite part 130 may include at least one portion of each category of constituent materials. For example, fiberglass has both matrix material (typically a plastic matrix such as epoxy, a thermosetting plastic like polyester or vinylester, or a thermoplastic) and reinforcement material (fibers of glass).

In composite part 130, the matrix material may surround and support the reinforcement materials by maintaining their relative positions. The reinforcement materials may impart their mechanical and physical properties to enhance the matrix properties. A synergism may produce material properties unavailable from the individual constituent materials.

Composite part 130 may be constructed by combining the matrix and reinforcement materials to undergo a melding event. One example of a melding event for a thermoset polymeric matrix material is a curing reaction initiated by the application of additional heat or chemical activity. One example of a melding event for a thermoplastic polymeric matrix material is solidification of the matrix from a prior melted state.

After the melding event, the shape of composite part 130 is essentially set. Composite part 130 may deform, however, under certain conditions. For example, subjecting composite part 130 to additional heat may re-melt the matrix material. As another example, subjecting composite part 130 to additional pressure may change the shape of composite part 130.

Some example composite parts 130 may be quite valuable. For example, composite part 130 may be a yoke for a helicopter rotor system. In the helicopter rotor system, the yoke transmits rotational energy from the drivetrain to the rotor blades. Because a composite helicopter yoke may be expensive to manufacture and difficult to replace once installed, it may be important to protect the composite helicopter yoke during vulcanization of the elastomeric layers 120 to the composite helicopter yoke as well as to protect the composite helicopter yoke from damage once installed in the helicopter rotor system.

Tool 110 vulcanizes elastomeric layers 120 to composite part 130 by applying heat and/or pressure. In operation, two uncured elastomeric layers 120 are placed on opposite sides of composite part 130. Tool 110 applies pressure and/or heat to both uncured elastomeric layers 120 and cures elastomeric layers 120 such that elastomeric layers 120 vulcanize to composite part 130.

Vulcanizing two elastomeric layers 120 to composite part 130 using tool 100 may present some problems, however. For example, vulcanizing the elastomeric layers 120 to composite part 130 may require heating elastomeric layers 120 and composite part 130 to a temperature of 280 degrees to 300 degrees Fahrenheit. Composite part 130, however, may lag behind elastomeric layers 120 in temperature for several reasons. First, tool 110 applies heat directly to elastomeric layers 120 but not composite part 130. In addition, composite part 130 may be made of a reinforcement material that acts as an insulator. For example, fiberglass is an insulator that resists heat transfer from elastomeric layers 120. If composite part 130 does not heat to near the same temperature as elastomeric layers 120 during vulcanization, elastomeric layers 120 may not stick to composite part 130 after curing.

Adding more heat to increase the temperature of composite part 130 may cause additional problems, however. For example, overheating elastomeric layers 120 may cause elastomeric layers 120 to become brittle and lose its elasticity. In addition, adding more heat to composite part 130 may cause deformation of composite part 130 in some areas. For example, the matrix and reinforcement materials of composite part 130 may cure together at 350 degrees, and portions of composite part 130 may begin to deform if those portions near 350 degrees.

One alternative method for vulcanizing two elastomeric layers 120 to composite part 130 may include vulcanizing a first elastomeric layer 120 to one side of composite part 130 first by applying heat directly to the first elastomeric layer 120 and the composite part 130 and then repeating this process for a second elastomeric layer 120 on the opposite side of composite part 130. This approach, however, also presents problems. For example, repeating the process for the second elastomeric layer 120 would most likely result in reheating the first elastomeric layer 120. Reheating the first elastomeric layer 120, however, may age the elastomeric layer 120 and cause it to become brittle and lose its elasticity.

Another alternative method may include curing the elastomeric layers 120 separately of composite part 130 and then gluing the cured elastomeric layers 120 to composite part 130 using a liquid adhesive. Liquid adhesives, however, may not form a sufficiently strong bond between elastomeric layers 120 and composite part 130, and elastomeric layers 120 may detach from composite part 130 after being glued. In addition, dried liquid adhesive may become brittle and break away from elastomeric layers 120 and/or composite part 130. Also, if composite part 130 bends or twists, the dried liquid adhesive may fracture and undermine the bond between elastomeric layers 120 and composite part 130.

Thus, directly vulcanizing elastomeric layers 120 to composite part 130 may result in a week bond between elastomeric layers 120 and composite part 130 and/or may damage composite part 130 during vulcanization, and liquid adhesive may not be able to securely attach cured elastomeric layers 120 to composite part 130. Teachings of certain embodiments recognize the capability to create a strong bond between elastomeric material and a part without directly vulcanizing the elastomeric material to the part.

FIGS. 2A and 2B show an elastomeric pad 200 according to one example embodiment. FIG. 2A shows a side view of elastomeric pad 200, and FIG. 2B shows a perspective view.

Elastomeric pad 200 includes a shim 210 and an elastomeric layer 220. Elastomeric layer 220 may be made from material similar to elastomeric layer 120 of FIG. 1. For example, elastomeric layer 220 may be a layer of elastomeric material, such as rubber, that has the property of elasticity.

Elastomeric pad 200 may be attached to a part, such as composite part 130, by attaching shim 210 to the part using adhesive 212. Teachings of certain embodiments recognize that vulcanizing elastomeric layer 220 to shim 210 and then attaching shim 210 to composite part 130 may protect composite part 130 from the vulcanization process while still maintaining a strong bond between elastomeric layer 220 and composite part 130.

In some embodiments, shim 210 is a composite shim constructed from a matrix material and a reinforcement material. Shim 210 may include the same matrix material and/or reinforcement material as composite part 130. For example, shim 210 and composite part 130 may both have woven fiberglass reinforcement material. In one example embodiment, shim 212 has a +/−45 degree fiberglass weave reinforcement material.

Shim 210 may be relatively thin compared to composite part 130. Teachings of certain embodiments recognize that using a thin shim 210 may allow shim 210 to attach elastomeric layer 220 to composite part 130 without substantially changing the physical attributes of composite part 130. For example, a shim 210 may not change the rigidity of composite part 130, allowing composite part 130 to bend and flex as designed. In addition, a thin shim 210 may improve the ability of elastomeric pad 200 to conform to curved parts.

In one example embodiment, shim 210 is a composite shim having woven fiberglass reinforcement material. Using a reinforcement material such as woven fiberglass may allow shim 210 to conform to a part without carrying a structural load from that part. In one example embodiment, shim 210 is less than 0.0025 inches thick (e.g., 0.0015 inches thick). Alternatively, shim 210 may be as thick as 0.1 inches in some embodiments depending on the intended use of elastomeric pad 200. For example, shim 210 may be thicker if elastomeric pad 200 will be attached to a flat surface of composite part 130.

Although shim 210 may be relatively thin compared to composite part 130, shim 210 may still be strong enough to support elastomeric layer 220. If shim 210 is too thin, for example, portions of shim 210 may wear away or tear, potentially exposing elastomeric layer 220 to composite part 130. Exposing elastomeric layer 220 to composite part 130 may reduce the strength of the bond between elastomeric pad 200 and composite part 130.

In one example embodiment, shim 210 is a composite shim having three layers of woven fiberglass reinforcement material and four layers of adhesive matrix. In some embodiments, shim 210 is at least 0.0004 inches thick.

Teachings of certain embodiments recognize that elastomeric pad 200 may allow for a thicker elastomeric layer 220 than the elastomeric layer 120 applied by tool 110 to composite part 130. In general, elastomeric material may not cure properly if the entire material is not heated to a sufficient temperature. Because shim 210 may be relatively thin, it may be easier to apply heat to both sides of elastomeric layer 220, which may allow for a thicker elastomeric layer 220.

Adhesive 212 may secure elastomeric pad 200 to composite part 130. Adhesive 212 may be a structural adhesive, such as a thermosetting modified epoxy structural adhesive like 3M Scotch-Weld Structural Adhesive Film AF 163.

In one example embodiment, a film of adhesive 212 is applied to shim 210 and/or composite part 130. In some embodiments, adhesive 212 may be the same material as the matrix materials of composite shim 210 and/or composite part 130.

In one example embodiment, a layer of adhesive 212 is provided on both shim 210 and composite part 130. For example, composite part 130 may be lined with a layer of adhesive 212 when composite part 130 is built. In one embodiment, the tool used to build composite part 130 may be lined with a layer of adhesive 212, which attaches to composite part 130. In one example, the tool used to build composite part 130 is lined with an approximately 0.0004 inch layer of adhesive 212.

Figure 3:
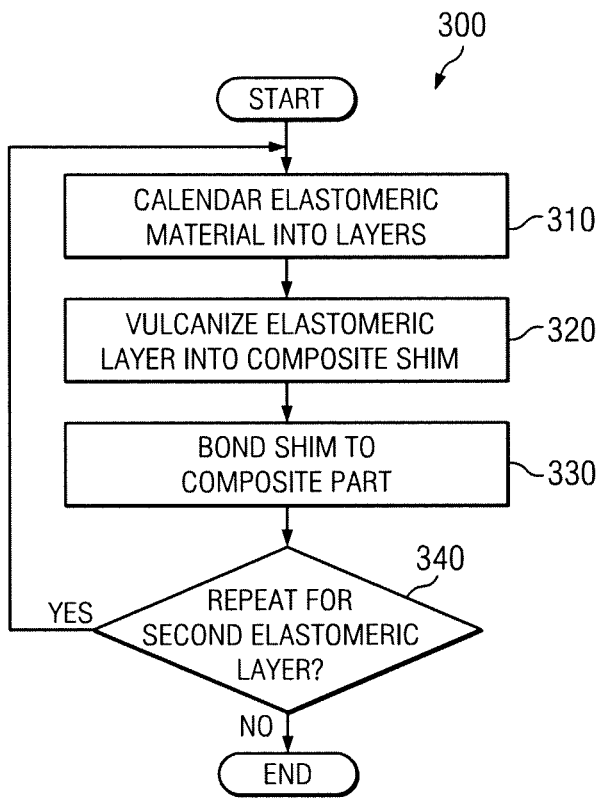
FIG. 3 shows a method for manufacturing and attaching the elastomeric pad of FIG. 2A to the composite part of FIG. 1 according to one example embodiment.

FIG. 3 shows a method 300 for attaching elastomeric material to two sides of a composite part according to one example embodiment. FIGS. 4A-4E show elastomeric pad 200 and composite part 130 in various stages of construction according to method 300 of FIG. 3.

Figure 4A:
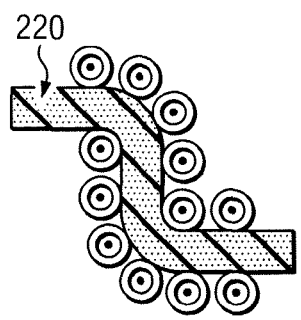
FIGS. 4A-4E show the elastomeric pad of FIG. 2A and the composite part of FIG. 1 in various stages of construction according to the method of FIG. 3.

At step 310, elastomeric material is calendered into a elastomeric layer 220, as shown in FIG. 4A. Calendering the elastomeric material may allow elastomeric layer 220 to have a thickness that is more uniform than the elastomeric material was prior to calendering.

Figure 4B:
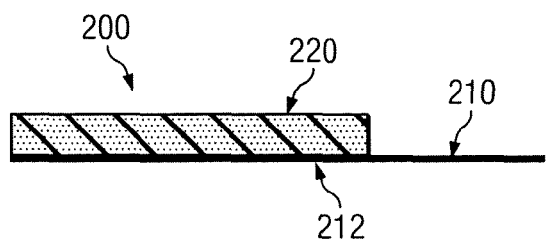
Figure 4C:
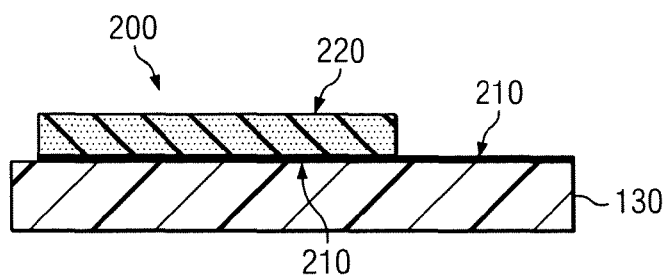

At step 320, elastomeric layer 220 is vulcanized to composite shim 210, as shown in FIG. 4B. In this example, a layer of adhesive 212 is provided on composite shim 210 opposite elastomeric layer 220.

At step 330, shim 210 is bonded to composite part 130. In some embodiments, shim 210 is bonded to composite part 130 by curing adhesive 212. In some embodiments, adhesive 212 may be cured through a process called vacuum bagging. According to the vacuum bagging process, a vacuum bag is sealed over the material to be cured, and air is removed from inside the vacuum bag to hold the material to be cured in place until it cures. Vacuum bagging may allow shim 210 to conform to the contour of composite part 130.

In one example embodiment, adhesive 212 is cured by heating adhesive 212 to a temperature of 200 degrees or less. Heating adhesive 212 over 200 degrees Fahrenheit may result in aging elastomeric layer 220 because first elastomeric layer 220 can become brittle and lose its elasticity if heated over 200 degrees Fahrenheit. Aging of elastomeric layer 220 is a function of both heat and time, however, and adhesive 212 may be heated to a temperature as high as 250 degrees Fahrenheit without aging first elastomeric layer 220 if heat is only applied for a short amount of time.

Thus, elastomeric pad 200 may be cured against composite part 130 without aging elastomeric layer 220. In addition, elastomeric pad 200 may be cured against composite part 130 without damaging composite part 130 because the heat necessary to cure adhesive 212 may be less than the amount of heat at which composite part 130 will deform.

In addition, the heat necessary to cure adhesive 212 may be less than the heat necessary to build composite part 130 or to vulcanize elastomeric layer 220. For example, the matrix material in composite part 130 may cure at a temperature greater than 250 degrees Fahrenheit (e.g., 350 degrees Fahrenheit). In addition, elastomeric layer 220 may vulcanize at a temperature greater than 250 degrees Fahrenheit (e.g., 280 degrees Fahrenheit).

Accordingly, teachings of certain embodiments recognize that bonding elastomeric layer 220 to composite part 130 by vulcanizing elastomeric layer 220 to shim 210 and then bonding shim 210 to composite part 130 may protect both elastomeric layer 220 and composite part 130 from damage. In addition, providing shim 210 between elastomeric layer 220 and composite part 130 may allow for a stronger attachment between elastomeric layer 220 and composite part 130 than if elastomeric layer 220 was glued directly to composite part 130 without shim 210.

Figure 4D:
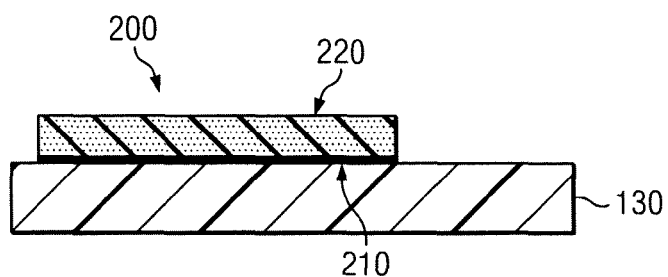
Figure 4E:
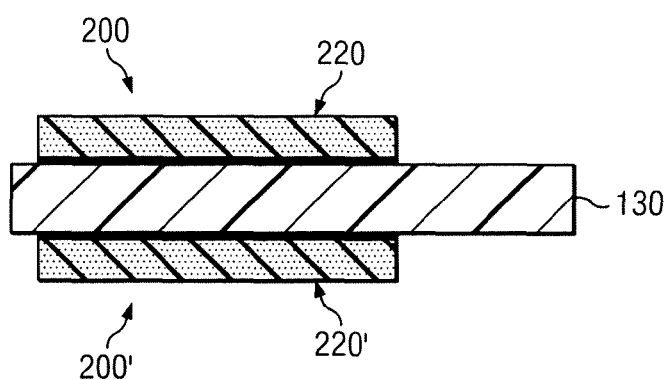

During the manufacturing process, elastomeric pad 200 may include excess shim 210. The excess shim 210 may be removed, as shown in FIG. 4D. For example, the excess shim 210 may be sanded down until the sander reaches the structural reinforcement material of composite part 130. In some embodiments, shim 210 has a 120 weave dry fiberglass reinforcement material, which may be sanded away after shim 210 is attached to composite part 130. In some embodiments, shim 210 has a colored matrix material (e.g., purple), and excess shim 210 may be sanded down until the colored material disappears.

At step 340, steps 310-330 are repeated for a second elastomeric layer 220'. For example, a second elastomeric pad 200' may be manufactured and attached to composite part 130 opposite of elastomeric layer 220. In some embodiments, the second elastomeric pad 220' may be attached to composite part 130 without disrupting or overheating elastomeric layer 220.

Although many of the examples described throughout discuss attaching elastomeric material to a composite part, teachings of certain embodiments recognize that elastomeric pad 200 may be applied to other materials as well. For example, elastomeric material may not easily vulcanize to metals such as titanium. In this example, it may be easier to attach shim 210 to titanium than directly vulcanizing the elastomeric material to titanium.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

What is claimed is:

1. A method for attaching elastomeric material to two sides of a composite part, the composite part comprised of a matrix and at least one layer of woven fiberglass, the method comprising:

calendering a first elastomeric material into a first elastomeric layer having a thickness that is more uniform than the first elastomeric material prior to the calendering;

vulcanizing the first elastomeric layer to a first composite shim comprising three layers of woven fiberglass and four layers of adhesive, wherein the first composite shim is less than 0.0025 inches thick after the vulcanizing;

bonding the first composite shim to a first side of the composite part using at least one of the four layers of adhesive of the first composite shim, wherein the first composite shim has a higher elastic limit than the composite part and at least one of the four layers of adhesive of the first composite shim is on a side of the first composite shim opposed to the first elastomeric layer;

calendering a second elastomeric material into a second elastomeric layer having a thickness that is more uniform than the second elastomeric material prior to the calendering;

vulcanizing the second elastomeric layer to a second composite shim comprising three layers of woven fiberglass and four layers of adhesive, wherein the second composite shim is less than 0.0025 inches thick after the vulcanizing; and bonding the second composite shim to a second side of the composite part opposite the first side using at least one of the four layers of adhesive of the second composite shim, wherein the second composite shim has a higher elastic limit than the composite part and at least one of the four layers of adhesive of the second composite shim is on a side of the second composite shim opposed to the second elastomeric layer.

2. A method comprising:

calendering an elastomeric material into an elastomeric layer having a thickness that is more uniform than the elastomeric material prior to the calendering;

vulcanizing the elastomeric layer to a composite shim comprising at least one reinforcement layer in a matrix and at least one layer of adhesive, wherein the at least one layer of adhesive of the composite shim is on a side of the composite shim opposed to the elastomeric layer; and bonding the composite shim to a composite part;
wherein the composite part comprises a second matrix and at least one layer of woven fiberglass and the composite shim has a higher elastic limit than the composite part.

3. The method of claim 2, wherein the composite shim comprises three layers of woven fiberglass and four layers of adhesive.

4. The method of claim 2, wherein the composite shim is less than 0.0025 inches thick after the vulcanizing.

5. The method of claim 2, wherein the composite shim is 0.0014-0.0016 inches thick after the vulcanizing.

6. The method of claim 2, wherein vulcanizing the elastomeric layer to the composite shim cures the elastomeric layer.

7. The method of claim 2, wherein the composite shim comprises fiberglass.

8. The method of claim 2, wherein vulcanizing the elastomeric layer to the composite shim cures the composite shim.

9. The method of claim 2, wherein the composite shim comprises woven fiberglass.

10. The method of claim 2, wherein bonding the composite shim to the part comprises heating the composite shim at a temperature of 250 degrees Fahrenheit or less.

11. The method of claim 2, wherein bonding the composite shim to the part comprises heating the composite shim at a temperature of 200 degrees Fahrenheit or less.

* * * * *